Oct. 25, 1960 R. D. TORREY 2,958,075

SHIFT REGISTER

Filed Jan. 30, 1956 2 Sheets-Sheet 1

INVENTOR

ROBERT D. TORREY

BY Charles C. English

AGENT

Oct. 25, 1960 R. D. TORREY 2,958,075

SHIFT REGISTER

Filed Jan. 30, 1956 2 Sheets-Sheet 2

INVENTOR

ROBERT D. TORREY

BY Charles C. English

AGENT

United States Patent Office 2,958,075

Patented Oct. 25, 1960

2,958,075

SHIFT REGISTER

Robert D. Torrey, Philadelphia, Pa., assignor to Sperry Rand Corporation, New York, N.Y., a corporation of Delaware Filed Jan. 30, 1956, Ser. No. 562,179

7 Claims. (Cl. 340—174)

Figure 1:
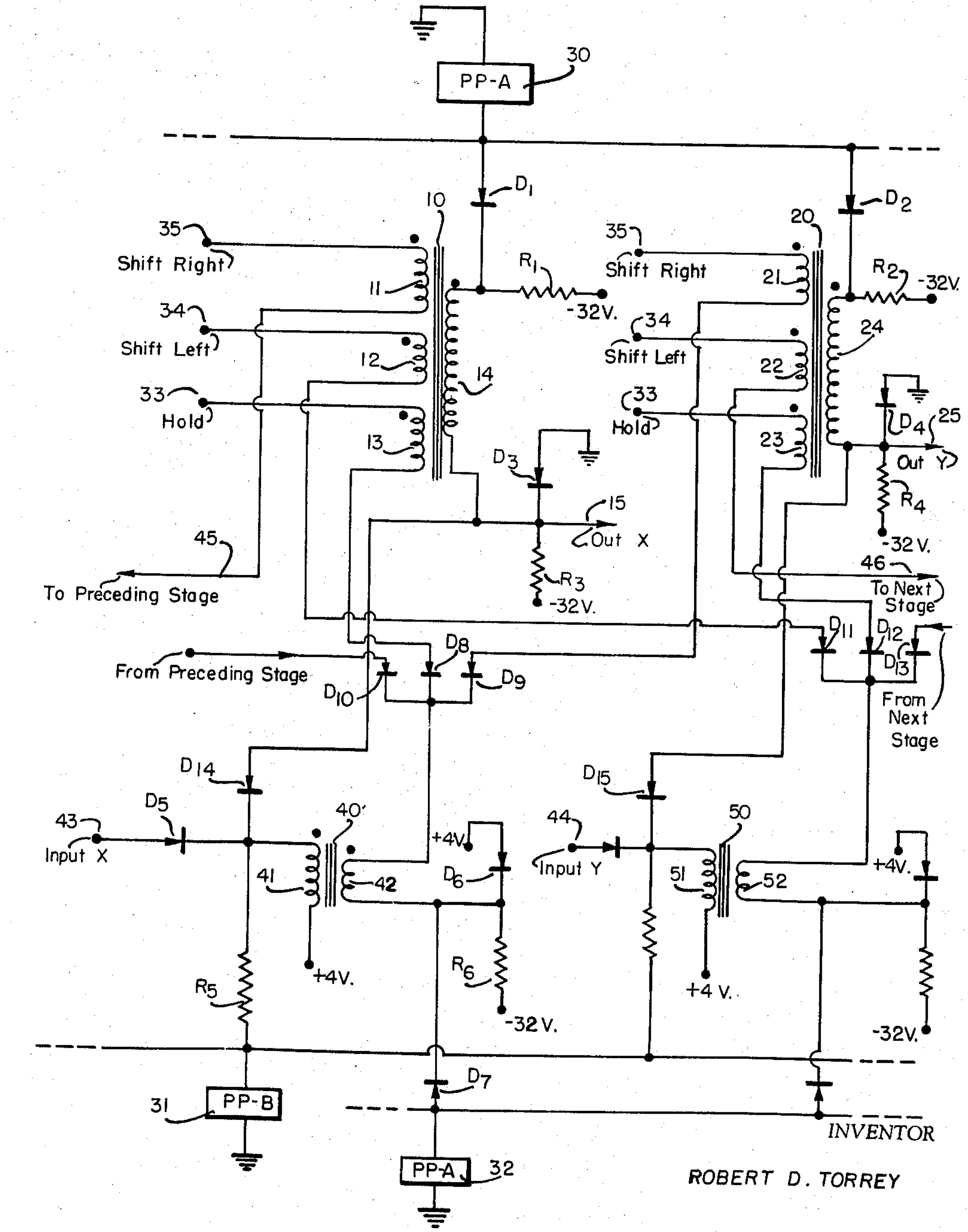

The present invention relates to shift registers for use in various control circuits such as those employed in digital computers; and is more particularly concerned with an improved shift register utilizing magnetic amplifiers and capable of a wide facility of operation.

The shift register comprises a basic component in many present-day computing apparatuses and is used to obtain, for example, either a physical translation of information signals within such an apparatus, or is used for obtaining a predetermined or variable time delay. In the past, such shift registers have normally utilized vacuum tube circuitry and the use of such circuitry has been accompanied by the disadvantage that the register was relatively large in size, was subject to breakage and to operating failures. These foregoing factors raised serious questions as to disposition of components as well as of maintenance and the cost attendant thereto. In order to reduce failures due to the foregoing difficulties, other forms of electrical devices have been suggested for use in shift registers, and one such other form employs the magnetic amplifier. It is with this particular type of component that the present invention is primarily concerned.

It is accordingly an object of the present invention to provide a novel shift register utilizing magnetic amplifiers as basic components thereof.

A further object of the present invention resides in the provision of a shift register which is both inexpensive to construct and which exhibits considerable ruggedness.

A still further object of the present invention resides in the provision of a shift register adapted to selectively hold information, and further adapted to shift that information either to the right or left in the register on command.

Still another object of the present invention resides in the provision of an improved shift register capable of being read into and out of either serially or in parallel.

A still further object of the present invention resides in the provision of an improved shift register, preferably employing magnetic amplifiers, which can be made in relatively small sizes.

Still another object of the present invention resides in the provision of a shift register having better operating characteristics and capable of a wider facility of operation than has been the case in the past.

In providing for the foregoing objects, the present invention employs a plurality of magnetic amplifier stages preferably of the non-complementing type, and such magnetic amplifiers may take the form taught in Steagall Patent No. 2,709,798, issued May 31, 1955, for "Bistable Devices Utilizing Magnetic Amplifiers." Each of the magnetic amplifier stages so provided preferably has a plurality of input windings, and these input windings in turn are associated with a plurality of variable impedances which are signal-responsive in nature. The arrangement is such that one input winding of each amplifier stage is associated with a given one of the said signal-responsive variable impedances; while further input winding of each such amplifier stage is associated with other variable impedances coupled to adjoining stages. By this arrangement, therefore, a given magnetic amplifier stage may be caused to assume an output producing state only in response to signals applied to an input winding of the selected stage as well as to the variable impedance associated with that input winding, for in the absence of such joint signals, the variable impedance assumes a magnitude sufficient to prevent the passage of current through the input winding of the magnetic amplifier stage. Once a magnetic amplifier stage is caused to assume an output producing state in response to the aforementioned joint signals, the information of which this output is representative may be shifted to an adjoining amplifier stage by selectively pulsing the input winding of the said adjoining stage which is coupled to the variable impedance associated with the first-mentioned output producing stage. This shift in information may be either to the right or left of a given amplifier stage thereby giving a considerable facility of operation to the over-all register.

In a preferred embodiment of the present invention, the signal-responsive variable impedances discussed above may be magnetic in nature and may comprise a core of magnetic material, preferably but not necessarily exhibiting a substantially reactangular hysteresis loop, and having a control winding and an output winding thereon. The output winding in each of the magnetic variable impedances may be caused to exhibit either a relatively high or relatively low impedance in response to signals applied to the input winding of the said variable impedance. Other forms of variable impedances will be suggested to those skilled in the art; and by the same token, other forms of amplifiers operating in the manner to be described, will be similarly suggested.

Figure 2:
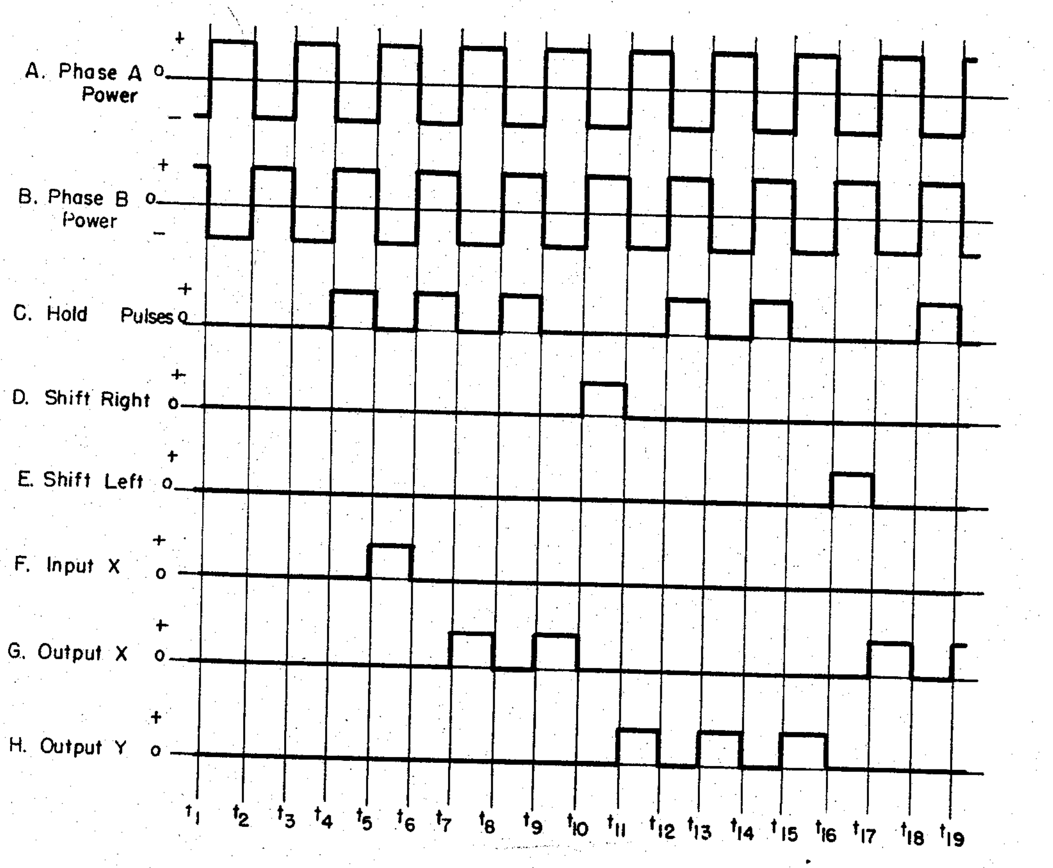

The foregoing objects, advantages, construction and operation of the present invention will become more readily apparent from the following description and accompanying drawings, in which:

Figure 1 is a schematic diagram of a shift register constructed in accordance with the present invention and corresponding to two stages of a plural-stage register; and Figures 2 (A through H) are waveform diagrams illustrating the operation of the circuit shown in Figure 1.

Referring now to Figure 1, it will be seen that in accordance with the present invention, a shift register of the magnetic type may comprise a pair of magnetic amplifiers having cores 10 and 20 respectively. Each of these magnetic amplifiers is associated with a plurality of input windings 11, 12, 13 and 21, 22, 23 respectively; and each is further associated with an output winding 14 and 24 respectively. The cores 10 and 20 may each comprise a magnetic material preferably but not necessarily exhibiting a substantially rectangular hysteresis loop, and the operation of the resultant magnetic amplifiers is in accord with the discussion given in the aforementioned Steagall Patent No. 2,709,798.

To review this operation briefly, it will be seen that the output windings 14 and 24 are coupled via rectifiers D1 and D2 to a source 30 of regularly occurring power pulses having a phase A. One end of each of the output windings 14 and 24 is coupled via resistors R1 and R2 to a source of negative potential; and the other end of each of the output windings 14 and 24 is coupled to an output point 15 and 25 respectively. The output points 15 and 25 are in turn selectively maintained at substantially ground potential by the clamp or sneak suppressor D3–R3 and D4–R4 associated respectively with the terminals 15 and 25.

If the cores 10 and/or 20 should be caused to operate over a saturated portion of their hysteresis loops during the application of a positive-going energization pulse from the source 30, windings 14 and 24 will be caused to assume a relatively low impedance whereby output pulses will appear at the points 15 and/or 25. If, on the other hand, the cores 10 and/or 20 should be caused to operate over unsaturated portions of their hysteresis loops, during the application of an energization pulse from the source 30, the output windings 14 and/or 24 will exhibit a relatively high impedance whereby no output appears at the terminal 15 or 25. Which portion of the core hysteresis loop is operatively utilized during the application of an energization pulse from the source 30 is determined by the passage of signal current through one of the windings 11, 12, 13 associated with amplifier core 10; and through one of the windings 21, 22, 23 associated with amplifier core 20.

Thus, by way of example, if the core 10 should initially be assumed to operate at its minus remanence operating point, a positive-going energization pulse from the source 30 will effect current flow via a rectifier D1 and winding 14 to the ground clamped output point 15 thereby causing the core 10 to be switched from its minus remanence to its plus remanence operating winding. The output point 14 for this state of operation exhibits a high impedance and no output appears at terminal 15 During a next subsequent negative-going pulse from the source 30, rectifier D1 is disconnected by the reverse-biasing effect of that negative-going pulse whereby a reverse current flows from ground via rectifier D3, and thence via winding 14 and resistor R1 thereby to cause the core 10 to be reverted to its minus remanence operating point. Thus, in the absence of an input to one of the windings 11, 12 or 13, core 10 will be caused to traverse its hysteresis loop without permitting outputs to appear at the terminal 15.

If, however, signal current should be effected in one of the windings 11, 12 and 13 during the application of a negative-going energization pulse from the source 30, this signal current flow will effect a magnetomotive force in the core 10 in opposition to the reverse current flow through winding 14 during this time interval whereby core 10 will be caused to remain at its plus remanence operating point. A next subsequent positive-going energization pulse from the source 30 will therefore drive core 10 into saturation; and for this state of operation, the output winding 14 exhibits a relatively low impedance whereby an output pulse appears at terminal 15. An analogous operation of course applies to the amplifier utilizing core 20.

It will be appreciated from the foregoing, that in order to cause a given amplifier stage, comprising the shift register of the present invention, to assume an output producing state, a signal current flow must be effected through one of the input windings associated with that amplifier. Each of the signal windings is coupled to a signal-responsive variable impedance at one of its ends and this variable impedance is such that in the absence of a control signal applied thereto, it assumes a relatively high magnitude preventing the passage of current through the associated input winding of the magnetic amplifier associated therewith.

In the example of Figure 1, these variable impedances are magnetic in nature and comprise, for instance, a pair of cores 40 and 50, each of which has a pair of windings 41—42 and 51—52 carried thereby. The operation of a given one of these variable impedances can be appreciated by an examination of the structure of that impedance associated with core 40, for instance. Thus, winding 41 is coupled at its lower end to a source of positive potential and is coupled at its upper end via a rectifier D5 to an input X terminal 43. The said upper end of winding 41 is also coupled via resistance R5 to a source 31 of regularly occurring positive and negative-going power pulses having a phase B. In this respect it should be noted in passing that the source 30 and 31 produce similar power or energization pulses, and the phase A and phase B notations merely refer to the fact that a positive-going portion of one of the said sources is associated with a negative-going portion of the other of said sources, and vice versa.

One end of winding 42 is selectively clamped at +4 volts potential by a clamp circuit comprising rectifier D6 and resistor R6, arranged as shown; and this same end of winding 42 is coupled via a rectifier D7 to a further source 32 of energization or power pulses having phase A. In operation, it will be seen that due to the provision of the source 32, the lower end of winding 42 is raised above ground potential during the occurrence of each positive-going pulse therefrom. The winding 42 is thus capable of passing a current only during time intervals corresponding to a negative-going traverse of the source 32.

The winding 41, being coupled as shown to the pulse source 31 at its upper end, and to the positive source of +4 volts at its lower end, is caused to pass currents in opposing directions during each polarity change of the source 31 in the absence of an input applied to terminal 43. Thus, if we should assume that core 40 is initially at its minus remanence operating point, and if we should further assume that no input appears at terminal 43, a positive-going energization pulse from source 31 will drive current via resistance R5 in a downward direction through winding 41 whereby the core 40 may be caused to flip from its minus to its plus remanence operating point. During a next subsequent negative-going pulse from source 31, current is driven in a reverse direction through winding 41 from the +4 volt source via resistor R5 to the source 31. Due to the difference in phase relationship between the sources 31 and 32, therefore, and in the absence of an input at terminal 43, the winding 42 will be caused to exhibit a relatively high impedance during each of the time intervals that it is capable of accepting current via one of rectifiers D8, D9, or D10.

If now an input pulse should be coupled to terminal 43 during the application of a negative-going energization pulse from source 31, this input pulse will oppose the upward current flow through coil 41 whereby core 40 will be caused to remain at its plus remanence operating point, for instance. During the next subsequent time interval that the source 32 assumes its negative potential, therefore, the winding 42 will exhibit a relatively low impedance whereby current can pass through winding 42 via one of rectifiers D8, D9 or D10, if such current flow is desired.

To summarize the foregoing, therefore, it will be seen that the variable impedance comprising core 40 and its associated components is such that it is caused to regularly exhibit a relatively high impedance in the absence of signal inputs thereto; while the application of a signal input to the variable impedance will cause the said impedance to assume a relatively low magnitude during the next subsequent time interval. An analogous operation, of course, applies to the variable impedance comprising core 50, windings 51 and 52, and input Y point 44.

Returning now to the over-all circuit shown in Figure 1, it will be seen that amplifier input winding 13 is coupled via rectifier D8 to the variable impedance provided by winding 42. Amplifier input winding 12 is in turn coupled via a rectifier D11 to the variable impedance presented by winding 52. Amplifier input winding 11 is coupled via a line 45 to the variable impedance of a preceding stage. Winding 21 is similarly coupled via rectifier D9 to the variable impedance presented by winding 42; winding 23 is coupled via rectifier D12 to the variable impedance presented by winding 52; and winding 22 is coupled via line 46 to the variable impedance of a next subsequent register stage. One of the input windings of a stage preceding the amplifier utilizing core 10 may also be coupled to the winding 42 via rectifier D10; and similarly, one of the input windings of a stage following that utilizing core 20 may be coupled to variable impedance winding 52 via rectifier D13.

The windings 13 and 23 are "hold" windings, and these windings are selectively energized by regularly occurring hold signals coupled to terminals 33. The interconnection of the hold winding in a given stage with the several variable impedances comprising the shift register, is such that one variable impedance is positively associated with each magnetic amplifier stage. The windings 12 and 22 are "shift left" windings, and these windings are selectively energized by shift left signals appearing at terminals 34; and are coupled at the other of their ends to the variable impedance associated with a register stage to the right of a given amplifier stage. Windings 11 and 21 are "shift right" windings, and these windings are selectively energized at one of their ends by shift right signals appearing at terminals 35 and are coupled at the other of their ends to the variable impedance associated with an amplifier to the left of a given amplifier stage.

It will be appreciated from the foregoing discussion that each of the input windings associated with a given amplifier stage is connected at one of its ends to a variable impedance. These input windings, therefore, cannot pass signal current unless the variable impedance associated therewith is in a low impedance state; and so long as the variable impedance associated with a given input winding is in a high impedance state that input winding cannot pass a current, notwithstanding the application of pulses at one of the terminals 33, 34 or 35. The several "hold" pulses, "shift left" pulses, and "shift right" pulses are selectively applied to the several input windings in the several amplifier stages simultaneously; but any one of these pulses will be ineffective in changing the output state of a given amplifier unless the variable impedance associated with a selected input winding of that amplifier is in a low impedance state.

This operation will become more readily apparent by considering the waveforms shown in Figure 2. Figures 2A and 2B illustrate respectively the phase A and phase B energization pulses provided by sources 30, 31 and 32. During a time interval *t1* to *t2*, the phase A power pulse supplied, for instance, by source 30, is positive-going and tends to drive current through winding 14, for instance. Inasmuch as the core 10 is assumed to initially reside at its minus remanence operation point, this current flow through winding 14 will find winding 14 to provide a relatively high impedance whereby no output will appear at terminal 15. During this same time interval *t1* to *t2*, the phase B pulse provided by source 31 is negative-going whereby current flows in an upward direction through winding 41, causing core 40 to move from its plus remanence to its minus remanence operating point. During a next subsequent time interval *t2* to *t3*, the phase A power pulse supplied by sources 30 and 32 assumes a negative potential, whereby core 10 is reverted to its minus remanence operating point. Similarly, during this time interval *t2* to *t3*, the phase B power pulse supplied by source 31 assumes a positive potential whereby current is driven in a downward direction through winding 41 causing core 40 to move from its minus remanence to its plus remanence operating point. In the absence of any inputs at terminals 33, 34, 35 or 43, therefore, each of cores 10 and 40 (and cores 20 and 50 for that matter), will be caused to regularly traverse their respective hysteresis loops, but no outputs will appear at either of terminals 15 or 25.

If now, during a time interval *t4* to *t5*, a hold pulse should appear at terminals 33, this hold pulse will attempt to effect current flow through winding 13 opposing the reverting current flow through winding 14 and resistor R1. Winding 13 is coupled at its lower end via rectifier D8 to winding 42, however, and inasmuch as no input signal had been applied to terminal 43 during the time interval *t3* to *t4*, the winding 42 will exhibit a relatively high impedance during this time interval *t4* to *t5* whereby rectifier D8 will be disconnected. Thus, the mere application of a hold pulse, for instance during time interval *t4* to *t5*, is ineffective to alter the operation of the circuit, and no output pulse appears at terminal 15.

If now, however, during a time interval *t5* to *t6*, an input X pulse should be applied to terminal 43, this pulse will oppose the reverting or upward current flow through winding 41 whereby core 40 will be caused to remain at its plus remanence operating point. A next subsequent hold pulse, therefore, applied during the time interval *t6* to *t7* will once more attempt to drive current in a downward direction through amplifier input winding 13. Inasmuch as winding 42 is now of low impedance, current is caused to pass in a downward direction through winding 13 and thence via rectifier D8 and low impedance winding 42 to the ground clamped lower end of the said winding 42. It should be noted that during this time interval *t6* to *t7* the energization pulse supplied by source 32 is negative in potential whereby the lower end of winding 42 is maintained at its clamped or substantially +4 volt potential. This passage of current through input winding 13 opposes the reverting current flow through output winding 14 during time interval *t6* to *t7* whereby core 10 is caused to remain at its plus remanence operating point; and the next subsequent positive-going power pulse from source 30, occurring for instance during time interval *t7* to *t8*, finds winding 14 to present a relatively low impedance whereby an output appears at terminal 15 (Figure 2G).

This output from the amplifier utilizing core 10 is also coupled via rectifier D14 to the upper end of winding 41 whereby it once more opposes the reverting current flow through winding 41 during the time interval *t7* to *t8*. The core 40 will thus be caused to remain at its plus remanence operating point and will not be flipped by the next subsequent positive-going power pulse from source 31 whereby winding 42 remains in a low impedance state. A next subsequent hold pulse applied to terminal 33 during the time interval *t8* to *t9* will thus once more effect current flow through amplifier input winding 13 thereby to once more produce an output X pulse at terminal 15 during the time interval *t9* to *t10*.

To summarize the foregoing operation, therefore, it will be seen that the successive application of an input pulse and a hold pulse to a given amplifier stage and to the variable impedance associated with that stage will cause the amplifier stage to assume an output producing condition, and these outputs will in turn maintain the variable impedance associated with that stage in a low impedance state so that further output pulses are achieved so long as hold pulses are applied. Inasmuch as no input Y pulse has been assumed at the terminal 44, however, the variable impedance winding 52 will continue to exhibit a high impedance state during the application of hold pulses to winding 23 whereby no outputs will appear at terminal 25.

If now, during a time interval *t10* to *t11*, a "shift right" pulse should be applied to the several terminals 35, this "shift right" pulse will attempt to effect current flow through each of the windings 11 and 21. Whether current actually flows through winding 11, of course, depends upon the impedance state of the variable impedance in the stage preceding the amplifier stage utilizing core 10, and for purposes of the present discussion it is assumed that this preceding variable impedance is still in a high impedance state whereby no current flows in winding 11. The "shift right" pulse applied to terminal 35 associated with winding 21 will effect current flow through the said winding 21, however, and thence via rectifier D9, inasmuch as the variable impedance winding 42 is in a low impedance state due to the previous operation discussed above.

Thus, the application of a "shift right" pulse during the time interval *t*10 to *t*11 will act to provide signal current through winding 21 during this time interval whereby an output pulse will appear at terminal 25 during the next subsequent time interval *t*11 to *t*12. This output pulse is, as before, coupled via a rectifier D15 to the upper end of winding 51 whereby winding 52 is caused to assume a low impedance state; and further output pulses will appear at terminal 25 so long as hold pulses are coupled to the terminals 33 (see Figure 2H). Thus, for the assumed operation described above, the application of a "shift right" pulse has caused the information formerly appearing as output pulses at terminal 15 to be shifted to the right whereby output pulses now commence appearing at terminal 25.

If now, a "shift left" pulse should be coupled to the several terminals 34 during the time interval *t*16 to *t*17 (Figure 2E), this "shift left" pulse will attempt to effect current flow through input windings 12 and 22, for instance. Whether current flow is actually passed through winding 22 will now depend upon the impedance state of the variable impedance coupled to line 46 in the next subsequent stage. Inasmuch, however, as the lower end of winding 12 is coupled via rectifier D11 to the low impedance winding 52, this application of a "shift left" pulse during the time interval *t*16 to *t*17 will effect a signal current flow through winding 12 whereby the amplifier utilizing core 10 once more commences producing output pulses during the time intervals *t*17 to *t*18, *t*19 to *t*20, et seq.

Thus, the over-all circuit operation is characterized by the fact that no current may be passed through a given amplifier input winding unless the variable impedance associated therewith is in a low impedance state. The circuit is further characterized by the fact that each amplifier has several input windings, and these input windings may be associated with a given variable impedance as well as with variable impedances to the right and left of the said given variable impedance. Due to this disposition of components, therefore, once an amplifier is caused to assume an output producing state, representative of information stored in that amplifier stage, this information may be shifted to either the right or left by pulsing the appropriate input winding of the amplifier stages to the right or left of the output producing stage.

While I have described a preferred embodiment of the present invention, many variations will be suggested to those skilled in the art. In particular, the several waveforms depicted in Figure 2 may assume other configurations, such as sinusoidal waves or other wave shapes. Further, the precise amplifier and variable impedance structures may be replaced by other components having analogous operating characteristics. The foregoing description is therefore meant to be illustrative only and should not be considered limitative of my invention. All such variations as are in accord with the principles described are meant to fall within the scope of the appended claims.

Having thus described my invention, I claim:

1. In a control circuit, a plurality of magnetic amplifier stages, each of which comprises a core of substantially saturable magnetic material and having a plurality of input windings thereon, a plurality of signal responsive variable impedances, first means coupling a first input winding of each of said amplifier stages to a different one of said variable impedances whereby each of said stages is associated with a different one of said variable impedances, second means coupling a second input winding of each of said amplifier stages to the variable impedance associated with an adjacent amplifier stage, first signal means for selectively applying first signals to each of said first windings, second signal means for selectively applying second signals to selected ones of said variable impedances whereby the amplifier stages associated with said selected variable impedances assume an output producing state in response to joint occurrence of said first and second signals, and third signal means for subsequently applying third signals to each of said second windings thereby to change the output stage of selected ones of said amplifier stages, each of said amplifiers including a third input winding, the second input winding of a given stage being coupled to the variable impedance associated with the amplifier stage to one side of said given stage, the third input winding of a given stage being coupled to the variable impedance associated with the amplifier stage to the other side of said given stage.

2. The circuit of claim 7 wherein each of said variable impedances comprises a core of substantially saturable magnetic material having a pair of windings thereon, said second signals being selectively applied to one of said pair of windings thereby to selectively change the effective impedance of the other of said windings.

3. The circuit of claim 1 wherein each of said variable impedances is series-coupled to its associated amplifier input winding.

4. A shift register comprising a plurality of magnetic amplifier stages, each of said stages comprising a core of substantially saturable magnetic material having first and second input windings thereon, a plurality of signal responsive variable impedances each including a circuit having a saturable magnetic core, means coupling each of said variable impedances to the first input winding on one of said amplifiers and to the second input winding on another of said amplifiers respectively, means coupling signals to the said first input windings and to selected ones of said variable impedances thereby to cause selected ones of said amplifiers to assume an output producing state, each of said amplifiers further comprising an output winding, and means coupling the output winding of each amplifier to the variable impedance which is coupled to the said first input winding of that amplifier, and means thereafter coupling shift signals to said second input windings thereby to shift said output producing state to other ones of said amplifiers, each of said amplifiers including a third input winding, means coupling the third input winding of a given amplifier to the variable impedance associated with an amplifier to one side of said given amplifier, said second input winding in said given amplifier being coupled to the variable impedance associated with the amplifier to the other side of said given amplifier, and means selectively applying further shift signals to each of said third input windings.

5. A shift register comprising a plurality of different stages arranged for operation in a series, each of said stages individually including a first and a second saturable magnetic element, first and second winding means linked to said first element, third and fourth winding means linked to said second element, and means for applying signals to said third winding means in accordance with signals produced across said first winding means when energized thereby to cause said second element to be in a substantially saturated or unsaturated state and said fourth winding means to have a high or low impedance accordingly; means connecting said fourth winding means of said stages in different series circuits with said second winding means of succeeding stages in said series; means for intermittently energizing each of said first winding means to drive said first elements in a first direction to produce signals thereacross in accordance with the magnetic state of the core and for energizing each of said first winding means in the opposite direction upon termination of the first direction energization; means for intermittently supplying energization for each of said third winding means in a direction tending to be opposed by the effect produced by said signals from said first winding means; and means for energizing each of said series circuits to cause each of said first elements to be in a certain magnetic state depending on the impedance of said fourth winding means of the preceding stage.

6. A shift register comprising a plurality of different stages arranged for operation in a series, each of said stages individually including a first and a second saturable magnetic element, first and second winding means linked to said first element, third and fourth winding means linked to said second element, means for applying signals to said third winding means in accordance with signals produced across said first winding means when energized thereby to cause said second element to be in a substantially saturated or unsaturated state and said fourth winding means to have a high or low impedance accordingly, and means connecting said fourth winding means in a first series circuit with a part of said second winding means; means connecting said fourth winding means of said stages in different second series circuits with a part of said second winding means of succeeding stages in said series; means for intermittently energizing each of said first winding means, and means for alternatively energizing each of said first or second series circuits to cause each of said first elements to be in a certain magnetic state depending on the impedance of said fourth winding means of the same or preceding stage, respectively, accordingly as said first or second series circuits are energized.

7. A shift register comprising a plurality of different stages arranged for operation in a series, each of said stages individually including a first and a second saturable magnetic element, first and second winding means linked to said first element, third and fourth winding means linked to said second element, and means for applying signals to said third winding means in accordance with signals produced across said first winding means when energized thereby to cause said second element to be in a substantially saturated or unsaturated state and said fourth winding means to have a high or low impedance accordingly; means connecting said fourth winding means of said stages in different first and second series circuits, respectively, with parts of said second winding means of preceding and succeeding stages in said series; means for intermittently energizing each of said first winding means; and means for alternatively energizing each of said first or second series circuits to cause each of said first elements to be in a certain magnetic state depending on the impedance of said fourth winding means of the succeeding or preceding stage, respectively, accordingly as said first or second circuits are energized.

References Cited in the file of this patent

UNITED STATES PATENTS

| | | |
|---|---|---|
| 2,710,952 | Steagall | June 14, 1955 |
| 2,729,807 | Paivinen | Jan. 3, 1956 |
| 2,760,085 | Van Rice | Aug. 21, 1956 |
| 2,772,370 | Bruce | Nov. 27, 1956 |

OTHER REFERENCES

Thesis on Magnetic Cores (Haynes), December 28, 1950, pp. 21–28 and 36–45; Fig. 29, page 39, is relied on.

"Magnistors—Amplifiers or Storage Element," Electronic Design, April 1955, pp. 26–27.

"Magnistor Circuits" (Snyder), Electronic Design, August 1955, pp. 24–27.